(12) United States Patent
Martin et al.

(10) Patent No.: US 8,317,004 B2
(45) Date of Patent: Nov. 27, 2012

(54) VALVE ASSEMBLY FOR DAMPER BETWEEN A LOWER CHAMBER AND A COMPENSATION CHAMBER IN THE DAMPER

(75) Inventors: Michel Martin, Le Creusot (FR); Guy Ducarouge, Le Breuil (FR); Françoise Schmutz, Givry (FR)

(73) Assignee: Alstom Transport SA, Levallois-Perret (FR)

( * ) Notice: Subject to any disclaimer, the term of this patent is extended or adjusted under 35 U.S.C. 154(b) by 382 days.

(21) Appl. No.: 12/570,920

(22) Filed: Sep. 30, 2009

(65) Prior Publication Data

US 2010/0078277 A1 Apr. 1, 2010

(30) Foreign Application Priority Data

Oct. 1, 2008 (FR) ...................................... 08 56631

(51) Int. Cl.
*F16F 9/34* (2006.01)

(52) U.S. Cl. .................................. 188/322.14; 188/315

(58) Field of Classification Search ............... 188/282.5, 188/282.6, 282.9, 315, 322.13, 322.14, 322.15; 137/493.4, 528, 535, 540, 542, 543
See application file for complete search history.

(56) References Cited

U.S. PATENT DOCUMENTS

| | | | | |
|---|---|---|---|---|
| 2,345,547 A | * | 3/1944 | Roth et al. | 137/81.1 |
| 2,531,532 A | * | 11/1950 | Rossman | 137/493.4 |
| 2,596,982 A | * | 5/1952 | Chisholm, Jr. | 137/493.5 |
| 2,616,711 A | * | 11/1952 | Whisler, Jr. et al. | 137/493.4 |
| 2,668,604 A | * | 2/1954 | Chisholm, Jr. | 188/320 |
| 2,726,737 A | * | 12/1955 | Chisholm, Jr. | 188/322.14 |
| 3,038,560 A | | 6/1962 | Long | 188/88 |
| 4,633,983 A | | 1/1987 | Horvath et al. | 188/322.14 |
| 4,650,043 A | * | 3/1987 | Eckersley | 188/322.14 |
| 4,989,699 A | * | 2/1991 | Zaenglein et al. | 188/322.14 |

FOREIGN PATENT DOCUMENTS

DE 265 206 A1 2/1989

* cited by examiner

*Primary Examiner* — Robert A Siconolfi
*Assistant Examiner* — Stephen Bowes
(74) *Attorney, Agent, or Firm* — Davidson, Davidson & Kappel, LLC

(57) ABSTRACT

A valve assembly is provided. The valve assembly includes a valve sliding in a valve holder and a base. The valve holder is held by the base by a resilient holding mechanism, the valve holder is mobile with respect to the base between a compression position and an expansion position. The valve holder includes a seat and a body extending beneath the seat and extending into the base. The holding mechanism is fixed on the one hand to the body of the valve holder and includes at least one portion extending beneath the lower face of the base, the portion resting against the lower face when the valve holder is in the expansion position. A damper is also provided.

9 Claims, 3 Drawing Sheets

VALVE ASSEMBLY FOR DAMPER BETWEEN A LOWER CHAMBER AND A COMPENSATION CHAMBER IN THE DAMPER

This claims the benefit of French Patent Application No. 08 56631, filed on Oct. 1, 2008 and hereby incorporated by reference herein.

The present invention relates to a valve assembly for a damper of the type comprising a valve sliding in a valve holder and a base intended to be supported on the bottom of the damper.

The present invention also relates to a damper comprising such a valve assembly.

BACKGROUND

In a damper, a piston rod and a piston are able to move within a chamber which may, for example, be filled with oil, separated by the piston into an upper chamber and a lower chamber. The piston is able to move between a compression position and an expansion position. In the compression phase the oil passes from the lower chamber to the upper chamber and in the expansion phase the oil passes from the upper chamber to the lower chamber. In the compression phase the piston rod and the piston move down into the chamber and thus reduce the available volume inside this chamber. Some of the oil thus needs to be evacuated from the chamber to compensate for the increase in volume of the piston rod in the chamber. In the compression phase the piston moves down into the chamber.

To this end a compensation chamber is provided which surrounds the upper and lower chambers and permits surplus oil to be evacuated from the lower chamber in the compression phase. In the expansion phase the piston rod and the piston move back up in the chamber and thus increase the available volume inside this chamber. Some of the oil in the compensation chamber goes back into the chamber to compensate for the decrease in volume of the piston rod in the chamber.

In order to allow the oil to flow between the compensation chamber and the lower chamber, a valve assembly is provided to control this flow. This valve assembly may, for example, include a valve sliding in a valve holder and a base intended to be supported on the bottom of the damper.

In known valve assemblies, the elastic holding device is fixed to the foot of the valve holder on the one hand and inserted into a groove provided on the upper surface of the base on the other hand. In the expansion phase, the holding device becomes deformed due to the partial vacuum created by the lack of oil in the lower chamber and is pressed against the groove, which "pulls" on the base.

SUMMARY OF THE INVENTION

Such valve assemblies are complicated to produce and assemble. The presence of a groove makes the production of the base more complicated and increases the dimensions of this base. In addition, during assembly the operator is required to insert the holding device into the groove by exerting manual pressure on this device so as to pre-tension it and fit it into the groove. This operation requires a considerable amount of pressure, especially if the diameter of the base is small. During this operation, the holding device is folded and may thus become twisted or deformed, which may lead to the valve malfunctioning during use. There is also the risk of the operator being injured when assembling the valve assembly.

One of the objects of the invention provides a valve assembly which is simple to assemble and produce and with smaller dimensions.

The present invention provides a valve assembly in which the holding mechanism is fixed to the body of the valve holder on the one hand and comprises at least one portion which extends beneath the lower face of the base, the portion resting on the lower face when the valve holder is in the expansion position.

Since the elastic holding device is located beneath the base, it is no longer necessary to provide a groove on the base. The dimensions of the base may be reduced and it may be easier to assemble, since the holding device can simply be fixed to the valve holder and positioned beneath the base, without the need to exert pressure on the device and fit it in the base. The risk of the holding device becoming deformed may also be reduced.

Other features of the valve assembly may include the following:
 the elastic holding device comprises a portion for fixing to the body of the valve holder and at least one elastic sheet which extends radially from the fixing portion, the end of this sheet being positioned beneath the lower face of the base;
 the holding device comprises multiple elastic sheets which extend radially from the fixing portion such that the holding device takes the form of a star;
 the valve holder comprises an end piece which is fixed to the end of the body opposite the seat, the end piece forming a stop mechanism which limits the movement of the valve holder in the expansion position;
 the elastic holding mechanism is fixed to the end piece of the valve holder;
 the valve slides in the body and the seat of the valve holder between a compression position in which the valve opens a passage passing through the body of the valve holder between the upper face and the lower face of the base and an expansion position in which the valve closes the passage; and
 a tensioning mechanism is located between the valve and the end piece of the valve holder, the tensioning mechanism controlling the movement of the valve in the compression position.

The present invention also provides a damper of the type comprising a piston which is able to move between a compression position and an expansion position between which a liquid moves between an upper chamber and a lower chamber of the damper. The damper also comprising a compensation chamber surrounding the upper and lower chambers, and a valve assembly which allows the liquid to pass from the lower chamber to the compensation chamber in the compression phase and from the compensation chamber to the lower chamber in the expansion phase, wherein the valve assembly is as described above.

According to another feature of the damper, the base of the valve assembly may be fitted to the lower end of the lower chamber between a tube defining the limits of the chambers and the bottom of the damper, the liquid passing through a passage opened by the valve in the compression phase and through a passage opened by the valve holder in the expansion phase.

DESCRIPTION OF THE DRAWINGS

Other aspects and advantages of the invention will become apparent on reading the following description which is given by way of example and refers to the attached drawings in which.

DETAILED DESCRIPTION

Figure 2:
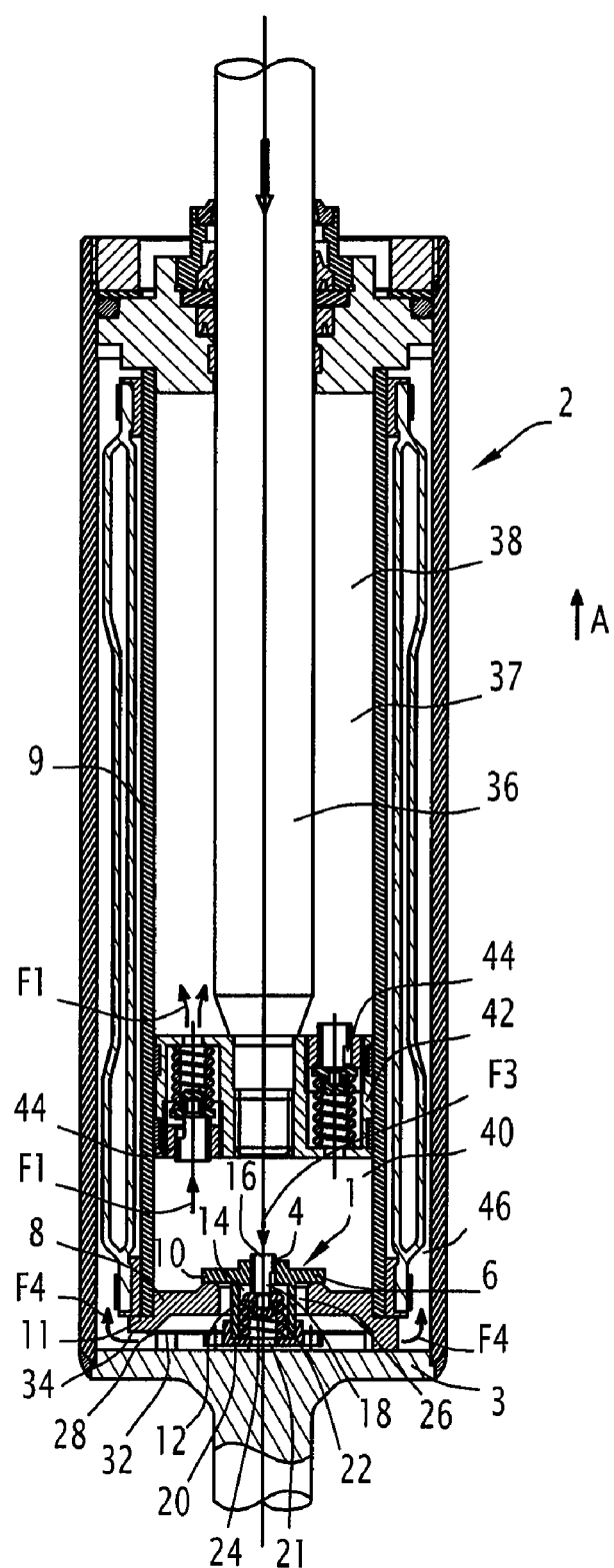
FIG. 2 is a schematic representation of a cross-section through a damper according to the invention in the compression phase.
Figure 3:
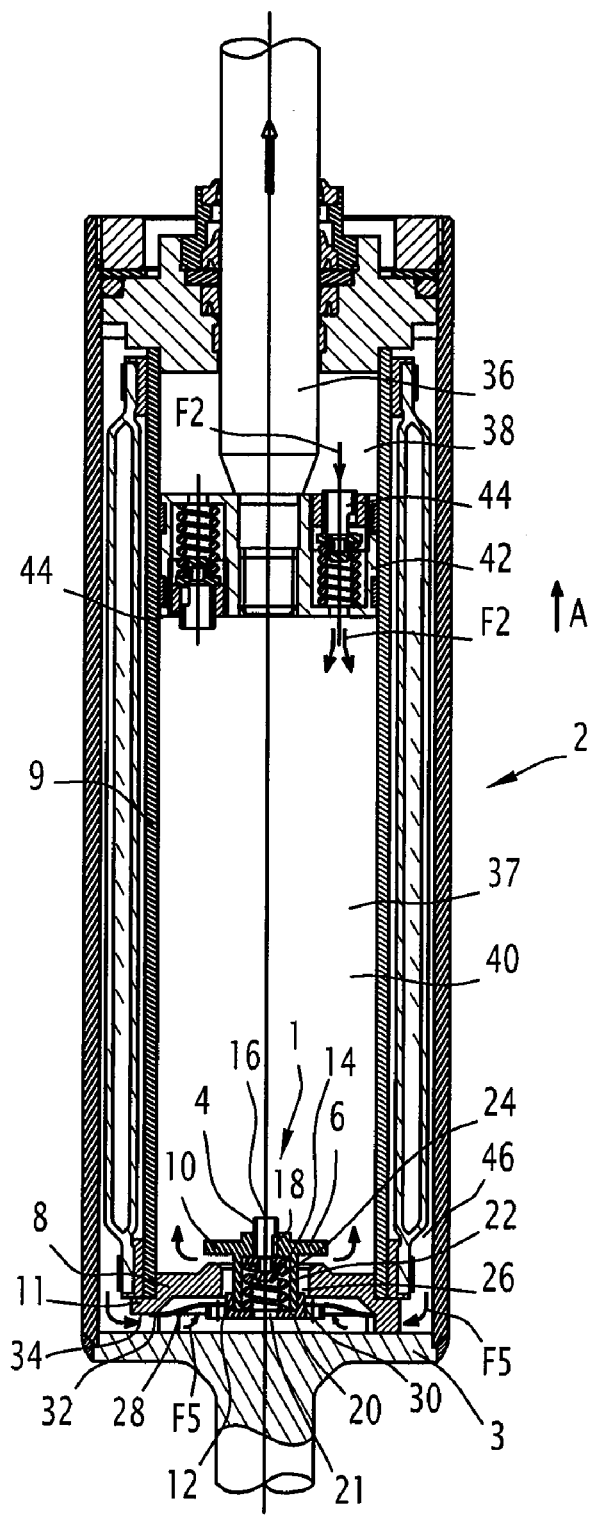
FIG. 3 is a schematic representation of a cross-section through the damper of FIG. 2 in the expansion phase.

In the description, the terms "upper", "lower", "beneath" and "above", etc. are defined with reference to a damper assembled as shown on FIGS. 2 and 3, the direction of elevation being shown by arrow A on these figures.

Figure 1:
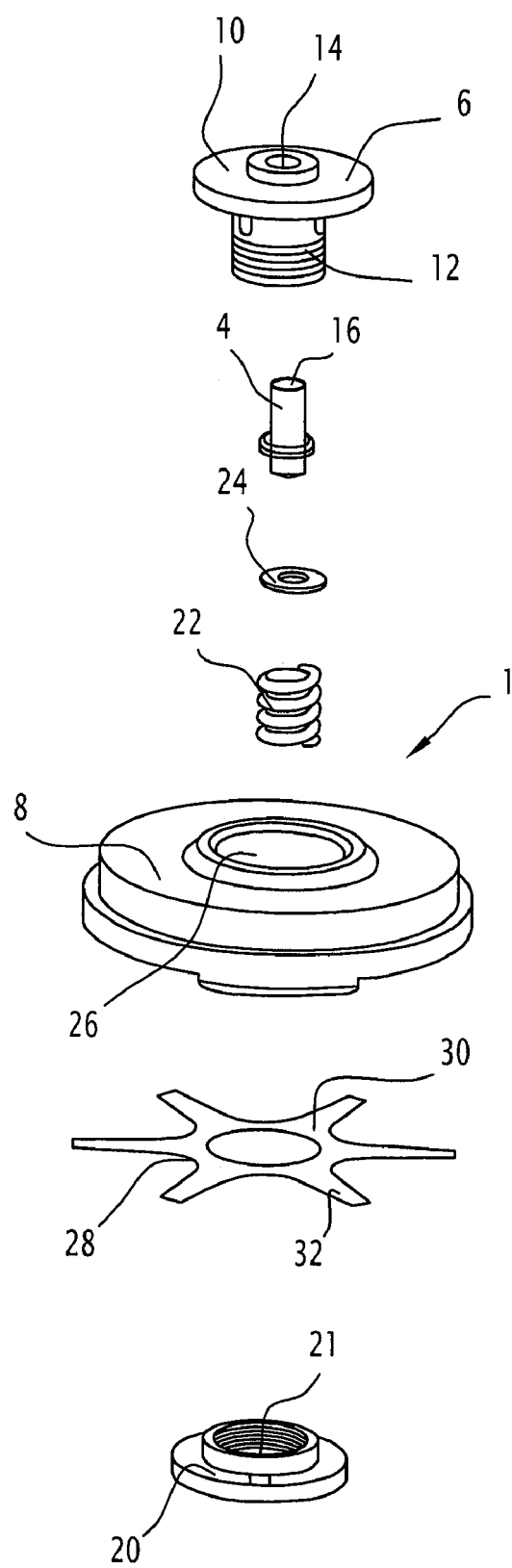
FIG. 1 is a schematic representation of a valve assembly according to the invention in exploded view.

With reference to FIG. 1 we describe a valve assembly 1 for a damper 2 comprising a valve 4 which slides in a valve holder 6 and a base 8 intended to be supported on the bottom of the damper 2.

As shown in FIGS. 2 and 3, the base 8 is located between the lower part of the tube 9 defining the limits of the volume of the chamber 37 of the damper and the bottom 3 of the damper 2. The tube 9 rests on an annular rim 11 formed on the upper face of the base 8, while the lower face 34 of the base 8 rests on the bottom of the damper 2. The operation of this damper 2 in relation to the valve assembly 1 will be described subsequently.

As shown in FIG. 1, the valve holder 6 comprises a seat 10 and a body 12 extending from the seat 10 beneath the seat to the inside of the base 8. The central portion of the valve holder comprises a bore 14 which passes through the seat 10 and the body 12. The bore 14 has a diameter corresponding to the outer diameter of the valve 4 in the body 12. The outer diameter of the body 12 is larger than the outer diameter of the valve 4.

The valve 4 is mounted such that it can slide in the bore 14 of the valve holder 6 with respect to the valve holder 6. The valve 4 comprises an upper aperture 16 which extends substantially horizontally around the axis of the valve 4 and a lower aperture 18 which extends substantially vertically into a lower part of the wall of the valve 4. The upper aperture 16 is connected to the lower aperture 18 by a bore which extends around the axis of the valve 4. The valve 4 is able to move between an expansion position (FIG. 3), in which the valve 4 primarily extends into the part of the bore 14 located in the seat 10 of the valve holder 6, and a compression position in which the lower aperture 18 extends into the part of the bore 14 located in the body 12 of the valve holder 6 (FIG. 2). Thus, in the expansion position, the lower aperture 18 is closed by the part of the bore 14 located in the seat 10 and in the compression position, the lower aperture 18 is open and leads into the part of the bore 14 with the larger diameter.

An end piece 20 is fixed to the end of the body 12 of the valve holder 6 opposite the seat 10.

To achieve this, the end piece 20 may, for example, be screwed to the end of the body 12. The end piece 20 has a central bore 21 connected to the bore 14 in the valve holder 6.

A resilient return mechanism 22, such as a spring, is mounted between the end piece 20 and the valve 4 and may, for example, be biased by means of a washer 24 extending between the return mechanism 22 and the valve 4. The return mechanism 22 is thus arranged such as to return the valve 4 into the expansion position when it has moved into the compression position.

The valve holder 6 is located in a central bore 26 in the base 8 and is mounted such that it can move with respect to this base between a compression position, in which the seat 10 rests on the upper surface of the base 8, and an expansion position, in which the seat 10 is moved upwards and does not rest on the base 8. The diameter of the bore 26 is larger than that of the body 12 of the valve holder.

The valve holder 6 is also held by the base 8 by means of a resilient holding device 28. The holding device 28 comprises a fixing portion 30 formed by a bore which is, for example, located around the end piece 20 prior to fixing to the body 12 of the valve holder. The holding device 28 also comprises multiple elastic sheets 32 which extend radially from the fixing portion so that the holding mechanism 28 takes the form of a star, as shown in FIG. 1. The end of one or more of these sheets 32 is located beneath the lower face 34 of the base 8 such as to hold the valve holder 6 with respect to the base 8 as shown on FIGS. 2 and 3. In the compression position, the holding mechanism 28 is not stressed. In the expansion position, the holding device 28 is supported against the lower face 34 and is deformed in order to allow the valve holder 6 to move as shown in FIG. 3. Note that in the expansion position the end piece 20 forms a stop mechanism which limits the movement of the valve holder 6 with respect to the base 8 by coming to rest against the valve holder. The holding device 28 returns the valve holder into the compression position when this is no longer stressed as described below.

As shown in FIGS. 2 and 3, the valve assembly 1 described above is located in the damper 2 which has a traditional design. Thus the damper 2 comprises a piston 42 and a piston rod 36 which are able to move within a chamber 37, separated by the piston 42 into an upper chamber 38 and a lower chamber 40. The chamber 37 is filled with oil, by way of example, which moves between the lower chamber 40 and the upper chamber 38 in the compression phase as shown by the arrows $F_1$ in FIG. 2 and between the upper chamber 38 and the lower chamber 40 in the expansion phase, as shown by the arrows $F_2$ in FIG. 3. To this end, the piston 42 is equipped with adequate valve assemblies 44 to allow oil to pass from one chamber to the other. Since this is a known arrangement, it will not be described in greater detail here.

The movement of the piston rod 36 and the piston 42 in the compression phase leads to a reduction in the volume available for oil in the chamber 37 due to the increase of the volume of the rod 36 in the chamber 37. This surplus oil is evacuated into a compensation chamber 46 located around the chamber 37 by means of the valve assembly 1. To this end, the base 8 is fitted at the end of the lower chamber 40 so as to close this chamber, between the tube 9 defining the limits of the chamber 37 and the base 3 of the damper 2, the valve 4 and the valve holder 6 being located in the lower chamber 40.

In the compression phase, the piston 42 moves downwards, the volume of the lower chamber 40 reduces and the pressure in this chamber increases. The increase in pressure causes the valve 4 to move to its compression position against the force of the return mechanism 22 and the oil passes into the valve 4 via its upper aperture 16 and is evacuated through its lower aperture 18 which is positioned opposite the body 12 of the valve holder 6 as shown by the arrow $F_3$ in FIG. 2. The surplus oil passes through the central bore 21 in the end piece 20 which is connected to the compensation chamber 46 and the oil is thus evacuated into the compensation chamber 46, as shown by the arrows $F_4$ in FIG. 2.

In the expansion phase, the piston 42 moves upwards, the volume of the lower chamber 40 increases and a partial vacuum forms in this chamber. The valve 4 is no longer stressed and the return mechanism 22 brings it back to its expansion position, thus closing its lower aperture 18. The partial vacuum causes the valve holder 6 to move upwards against the force exerted by the holding mechanism 28, which is deformed. The seat 10 of the valve holder lifts and detaches from the base 8, opening up a passage between the lower chamber 40 and the central bore 26 in the base 8. Due to the partial vacuum, the oil moves into this passage and passes from the compensation chamber 46 into the lower chamber 40, as shown by the arrows $F_5$ in FIG. 3. When the partial vacuum disappears, the holding mechanism 28 returns the valve holder 6 to its compression position, which closes the passage between the central bore 26 in the base 8 and the lower chamber 40.

The position of the holding device 28 in the valve assembly 1 described above makes it easier to construct and assemble this valve assembly 1. This is because the groove which was provided on top of the base in valve assemblies of the prior art is no longer required, thus simplifying the construction of this base and making it less bulky. In addition, the holding mechanism 28 is simply fixed between the valve holder 6 and the base 8, without the need for any particular pressure or deformation of the holding mechanism 28.

What is claimed is:

1. A valve assembly for a damper comprising:
a valve holder;
a valve sliding in the valve holder;
a base supported on the bottom of the damper; and
a resilient holding mechanism holding the valve holder to the base,
the valve holder being mobile with respect to the base between a compression position in which the holding mechanism is not stressed, and an expansion position in which the holding mechanism is stressed,
the valve holder including a seat resting on the base in the compression position and a body extending beneath the seat and extending into the base,
the holding mechanism being fixed to the body of the valve holder and including at least one portion extending beneath the lower face of the base, the portion resting against the lower face when the valve holder is in the expansion position;
the holding mechanism being flat in the compression position while the holding mechanism is not stressed.

2. The valve assembly according to claim 1, wherein the resilient holding mechanism includes a fixing portion for fixing to the body of the valve holder and at least one elastic sheet extending radially from the fixing portion, the end of the sheet being located beneath the lower face of the base.

3. The valve assembly according to claim 2, wherein the at least one elastic sheet includes multiple elastic sheets extending radially from the fixing portion such that the holding mechanism is in the form of a star.

4. The valve assembly according to claim 1, wherein the valve holder includes an end piece fixed to the end of the body opposite the seat, the end piece forming a stop mechanism limiting the movement of the valve-holder in the expansion position.

5. The valve assembly according to claim 4, wherein the resilient holding mechanism is fixed to the end piece of the valve holder.

6. The valve assembly according to claim 1, wherein the valve slides in the body and the seat of the valve holder between the compression position in which the valve opens a passage passing through the body of the valve holder between the upper face and the lower face of the base, and the expansion position in which the valve closes the passage.

7. The valve assembly according to claim 6, further comprising a tensioning mechanism located between the valve and the end piece of the valve holder, the tensioning mechanism controlling the movement of the valve in the compression position.

8. A damper including:
a piston moving between a compression position and an expansion position between which a liquid moves between an upper chamber and a lower chamber of the damper;
a compensation chamber surrounding the upper and lower chambers; and
a valve assembly allowing the liquid to pass from the lower chamber to the compensation chamber in the compression position and from the compensation chamber to the lower chamber in the expansion position,
the valve assembly including:
a valve holder;
a valve sliding in the valve holder;
a base supported on the bottom of the damper; and
a resilient holding mechanism holding the valve holder to the base,
the valve holder being mobile with respect to the base between the compression position in which the holding mechanism is not stressed, and the expansion position in which the holding mechanism is stressed,
the valve holder including a seat resting on the base in the compression position and a body extending beneath the seat and extending into the base,
the holding mechanism being fixed to the body of the valve holder and including at least one portion extending beneath the lower face of the base, the portion resting against the lower face when the valve holder is in the expansion position;
the holding mechanism being flat in the compression position while the holding mechanism is not stressed.

9. The damper according to claim 8, wherein the base of the valve assembly is fitted to a lower end of the lower chamber between a tube defining limits of the upper and lower chambers and a bottom of the damper, the liquid passing through a passage opened via the valve in the compression position and through a passage opened via the valve holder in the expansion position.

* * * * *